United States Patent [19]

Fukui

[11] Patent Number: 4,963,909
[45] Date of Patent: Oct. 16, 1990

[54] CAMERA SYSTEM FOR SELECTIVELY GENERATING NEW MEMORY ADDRESS WHEN A NEW SWITCHING STATE IS DIFFERENT FROM A PREVIOUS SWITCHING STATE

[75] Inventor: Hajime Fukui, Tokyo, Japan

[73] Assignee: Canon Kabushiki Kaisha, Tokyo, Japan

[21] Appl. No.: 284,907

[22] Filed: Dec. 15, 1988

[30] Foreign Application Priority Data

Dec. 24, 1987 [JP] Japan .................. 62-325474

[51] Int. Cl.⁵ .................. G03B 17/00; G06F 12/02
[52] U.S. Cl. .................. 354/286; 354/400; 364/200; 364/261; 364/261.2; 364/264.5
[58] Field of Search ... 364/200 MS File, 900 MS File, 364/141; 371/67; 354/286, 400, 412

[56] References Cited

U.S. PATENT DOCUMENTS

| | | | |
|---|---|---|---|
| 4,488,220 | 12/1984 | Friedli et al. | 364/200 |
| 4,633,390 | 12/1986 | Yoshida | 364/200 |
| 4,642,760 | 2/1987 | Yanai et al. | 362/200 |
| 4,745,541 | 5/1988 | Vaniglia et al. | 364/141 |
| 4,764,928 | 8/1988 | Akerberg | 371/67 X |
| 4,803,509 | 2/1989 | Nakai et al. | 354/286 X |
| 4,860,113 | 8/1989 | Miyamoto et al. | 354/286 X |
| 4,896,181 | 1/1990 | Saegnsa | 354/286 |

Primary Examiner—Thomas C. Lee
Attorney, Agent, or Firm—Robin, Blecker, Daley & Driscoll

[57] ABSTRACT

In an information processing device which obtains, by computation, an address corresponding to input information obtained from an input device and reads out data from the computed address, instead of performing an address computing operation every time a data reading action is required, data is directly read out by using a previously computed address in cases where the input information obtained at the time of a current data reading action is judged to be unchanged from input information obtained at the time of a preceding data reading action. The address computing operation is required only when the input information currently obtained differs from input information previously obtained at the time of the preceding data reading action.

5 Claims, 8 Drawing Sheets

FIG.7

| ADDRESS(H) | | EXTENDER SWITCH | | FOCAL LENGTH SWITCH | | | | | HIGHER/LOWER POSITION BIT |
|---|---|---|---|---|---|---|---|---|---|
| | | SW7 | SW6 | SW4 | SW3 | SW2 | SW1 | SW0 | · |
| 1000 | HIGHER POSITION | 0 | 0 | 0 | 0 | 0 | 0 | 0 | 0 |
| 1001 | LOWER POSITION | 0 | 0 | 0 | 0 | 0 | 0 | 0 | 1 |
| 1002 | HIGHER POSITION | 0 | 0 | 0 | 0 | 0 | 0 | 1 | 0 |
| 1003 | LOWER POSITION | 0 | 0 | 0 | 0 | 0 | 0 | 1 | 1 |
| ⋮ | | | | | ⋮ | | | | |
| 103E | | 0 | 0 | 1 | 1 | 1 | 1 | 1 | 0 |
| 103F | | 0 | 0 | 1 | 1 | 1 | 1 | 1 | 1 |
| 1040 | | 0 | 1 | 0 | 0 | 0 | 0 | 0 | 0 |
| 1041 | | 0 | 1 | 0 | 0 | 0 | 0 | 0 | 1 |
| ⋮ | | | | | ⋮ | | | | |
| 107E | | 0 | 1 | 1 | 1 | 1 | 1 | 1 | 0 |
| 107F | | 0 | 1 | 1 | 1 | 1 | 1 | 1 | 1 |
| 1080 | | 1 | 0 | 0 | 0 | 0 | 0 | 0 | 0 |
| 1081 | | 1 | 0 | 0 | 0 | 0 | 0 | 0 | 1 |
| ⋮ | | | | | ⋮ | | | | |
| 10BE | | 1 | 0 | 1 | 1 | 1 | 1 | 1 | 0 |
| 10BF | | 1 | 0 | 1 | 1 | 1 | 1 | 1 | 1 |
| 10C0 | | 1 | 1 | 0 | 0 | 0 | 0 | 0 | 0 |
| 10C1 | | 1 | 1 | 0 | 0 | 0 | 0 | 0 | 1 |
| ⋮ | | | | | ⋮ | | | | |
| 10FE | | 1 | 1 | 1 | 1 | 1 | 1 | 1 | 0 |
| 10FF | | 1 | 1 | 1 | 1 | 1 | 1 | 1 | 1 |

FOCAL LENGTH DATA TABLE ON ROM 3

SWITCH ALIGNMENT CORRESPONDING TO CHANGES IN FOCAL LENGTH

"∧" DENOTES "AND".
"∨" DENOTES "OR".

CAMERA SYSTEM FOR SELECTIVELY GENERATING NEW MEMORY ADDRESS WHEN A NEW SWITCHING STATE IS DIFFERENT FROM A PREVIOUS SWITCHING STATE

BACKGROUND OF THE INVENTION

1. Field of the Invention

This invention relates to an information processing device which is disposed at the lens unit of a camera or the like and which is arranged to obtain from the outside, for example, such information that is necessary for focus control (focal length information); to determine a data storing address on a ROM on the basis of the information; to read out, from the address, data to be used for the focus control; and to supply the data to a signal processing system which is disposed on the side of the camera body.

2. Description of the Related Art

Data concerning a focal length, a full aperture value, etc. used for the exposure control, focus control, etc. of a camera varies with a focal length selected in cases where a zoom lens is used. Even in the case of a monofocal lens, the data varies accordingly as a photo taking distance (an amount of lens delivery) varies. Therefore, every time the data is required for computation and control, the state of a switch which consists of a code plate and a brush or the like secured to a lens barrel or the like and which indicates a currently selected focal length or an amount of lens delivery, is read out; then an address on a ROM in which data corresponding to the state of the switch has been stored is determined; and the data is read out from the address to be used for computation and control.

The flow of the above-stated operation of the conventional arrangement for reading out data from the ROM is as described below with reference to FIGS. 5 to 8 of the accompanying drawings.

Referring to FIG. 5, a core part (CPU) 1 of a microcomputer is provided with four-bit general-purpose registers A and E which are not shown. The illustration includes a RAM 2; a ROM 3 having a program and data written therein; a buffer part 4 which is provided for serial communication between a lens unit and a camera body; a CPU 5 which is disposed on the side of the camera body; an address bus "a" which indicates addresses on the RAM 2; a data bus "b" which is provided for making reference to data of the RAM 2; an address bus "c" which indicates addresses on the ROM 3; a data bus "d" which is provided for making reference to data or a program of the ROM 3; a clock line "e" which is provided for synchronizing the serial communication between the lens unit and the camera body by transmitting a synchronizing clock pulse which is shown in FIG. 6; a serial data line "f" which is provided for transmitting a command or data from the camera body to the lens unit, as shown in FIG. 6; and a serial data line "g" which is provided for transmitting information on the state of the lens unit and data from the lens unit to the camera body, as shown in FIG. 6.

Five-bit switches SW0 to SW4 are arranged to indicate a focal length. A one-bit switch SW5 is arranged to permit a selection of the photographing mode of the camera between a macro photographing mode and a non-macro photographing mode. Two-bit switches SW6 and SW7 are arranged to indicate whether an extender lens is mounted or not mounted and to indicate the kind of the extender lens if it is mounted. Four-bit switches SW8 to SW11 are provided for correcting any deviation from the best focus position due to a manufacturing error. These switches SW0 to SW11 are connected to input ports of the CPU 1 for every four bits. The switches SW0 to SW3 are connected to an input port PORT0, the switches SW4 to SW7 to an input port PORT1 and the switches SW8 to SW11 to another input port PORT2, respectively.

In reading out, from an address on the ROM 3 which is, for example, 1000 H (wherein H is used to indicate a hexadecimal number), a focal length data of two bytes which is set by means of the five-bit focal length switches SW0 to SW4 and the two-bit extender switches SW6 and SW7, the conventional device which is arranged as described above performs this reading action as follows.

Referring to FIG. 7, the focal length data of two bytes which corresponds to the alignment of the switches SW0 to SW4, SW6 and SW7 is stored in an area of 256 bytes. Therefore, in reading out data from the ROM 3, the alignment of the switches SW0 to SW4, SW6 and SW7 read at the input ports PORT0 and PORT1 shown in FIG. 5 must be converted into a switch alignment as shown in FIG. 7. An example of this conversion is described below with reference to the flow chart of FIG. 8.

Step #21: States of the switches SW4 to SW7 are read out and taken into the register A (not shown) via the input port PORT1. Step #22: The content of the register A is shifted to the register E which is also not shown. This causes the register E to have the same data as the register A. Step #23: The register A is masked with "0001B", wherein B is used to indicate a binary number. This causes the content of the register A to become "0, 0, 0, SW4". Step #24: The contents of the registers A and E are exchanged with each other. Step #25: The content of the register A is shifted one bit to the right. This causes the content of the register A to become "0, SW7, SW6, SW5". Step #26: The register A is masked with "1110B". This causes the content of the register A to become "0, SW7, SW6, 0". Step #27: The logical sum of the contents of the registers E and A is substituted for the register E. That causes the content of the register E to become "0, SW7, SW6, SW4". Step #28: Information on the states of the switches SW0 to SW3 is read and taken into the register A via the input port PORT0. As a result, the contents of the registers E and A become "0, SW7, SW6, SW4, SW3, SW2, SW1, SW0". Step #29: The contents of the registers E and A are shifted one bit to the left. This causes the contents of the registers E and A to become "SW7, SW6, SW4, SW3, SW2, SW1, SW0, 0".

A computing operation for determining an address is completed through these steps. The flow of operation then proceeds to a step #30 for reading a data table provided on the ROM 3. At the step #30: Two bytes of higher position (10H) of a first address (1000H in this example) at which information on a focal length has been stored is substituted for a base register which is not shown. Data is read out as an offset from the first address on the basis of an address previously computed.

As apparent from the above description, the conventional device is arranged to read out information on the states of the switches at a point of time when data becomes necessary; then, an address at which the desired data on the ROM 3 has been stored is determined; and the data is read out from the address. However, this arrangement of the conventional device presents the following problems.

(i) The kinds and quantity of necessary lens data increase accordingly as a desired computation and a control over distance and light measuring actions become more complex. As a result, it becomes necessary to determine the address on the ROM 3 not merely by reading the states of the switches but also by performing a soft-ware process for shifting and rotating the states of the switches read out. The data of varied kinds is then repeatedly read out from a data table provided on the ROM 3 for distance or light measurement. In that instance, the length of processing time required for determining the address by the soft-ware process becomes too long to attain a high speed computing operation.

(ii) In the case of a camera which is capable of setting a focal length by turning a zoom ring, if the camera is arranged to divide a distance between telephoto and wide-angle positions into 32 parts by means of five-bit focal length switches, the switch position changes once for every 30 msec or thereabout when the distance is completely covered by turning the zoom ring in one second. Therefore, even if a computing operation is performed at every one msec, the switch position changes only once while the computing operation is performed 30 times. Further, a high speed computing operation is hindered also to a great degree by the arrangement to determine the address every time a data reading is required in cases where the camera includes such a switch as an extender lens switch the position of which never changes after an extender lens is mounted until a power supply from the camera body is turned off with the extender lens removed for replacing it with another lens or a manufacturing error correction switch the position of which never changes after adjustment is made during the camera manufacturing process.

SUMMARY OF THE INVENTION

One aspect of the present application is to provide an information processing device which solves the above stated problems of the prior art and which is capable of promptly reading out desired data to permit high speed computing and control operations on the basis of the data thus read out.

Another aspect of the application resides in the provision of an information processing device comprising: rewritable storage circuitry having a first area for storing the preceding state of an information input switch read out by data reading circuitry and a second area for storing the preceding address obtained through a computation by the data reading circuitry; and signal processing control circuitry arranged to compare the preceding state of the information input switch stored in the first area of the rewritable storage circuitry with the current state of the information input switch read out by the data reading circuitry, to instruct the data reading circuitry to read out data from fixed storage circuitry on the basis of the preceding address stored in the second area when no change is found in the state of the information input switch, and to instruct the data reading circuitry to obtain a referable address of the fixed storage circuitry according to the current state of the information input switch and to read out from the fixed storage circuitry data corresponding to the obtained address when a change is found in the state of the information input switch. The device according to the invention is thus arranged such that: When no change is found by comparison between the preceding state and the current state of the information input switch, no computing operation for obtaining any address at which data corresponding to the state of the information input switch has been stored and, in this instance, the preceding address stored in the second area of the rewritable storage circuitry is used as a current address.

The above and other objects and features of the invention will become apparent from the following detailed description of embodiments thereof taken in connection with the accompanying drawings.

BRIEF DESCRIPTION OF THE DRAWINGS:

FIG. 7 is a chart showing data written in a ROM in relation to addresses.

DETAILED DESCRIPTION OF THE PREFERRED EMBODIMENTS

Figure 1:
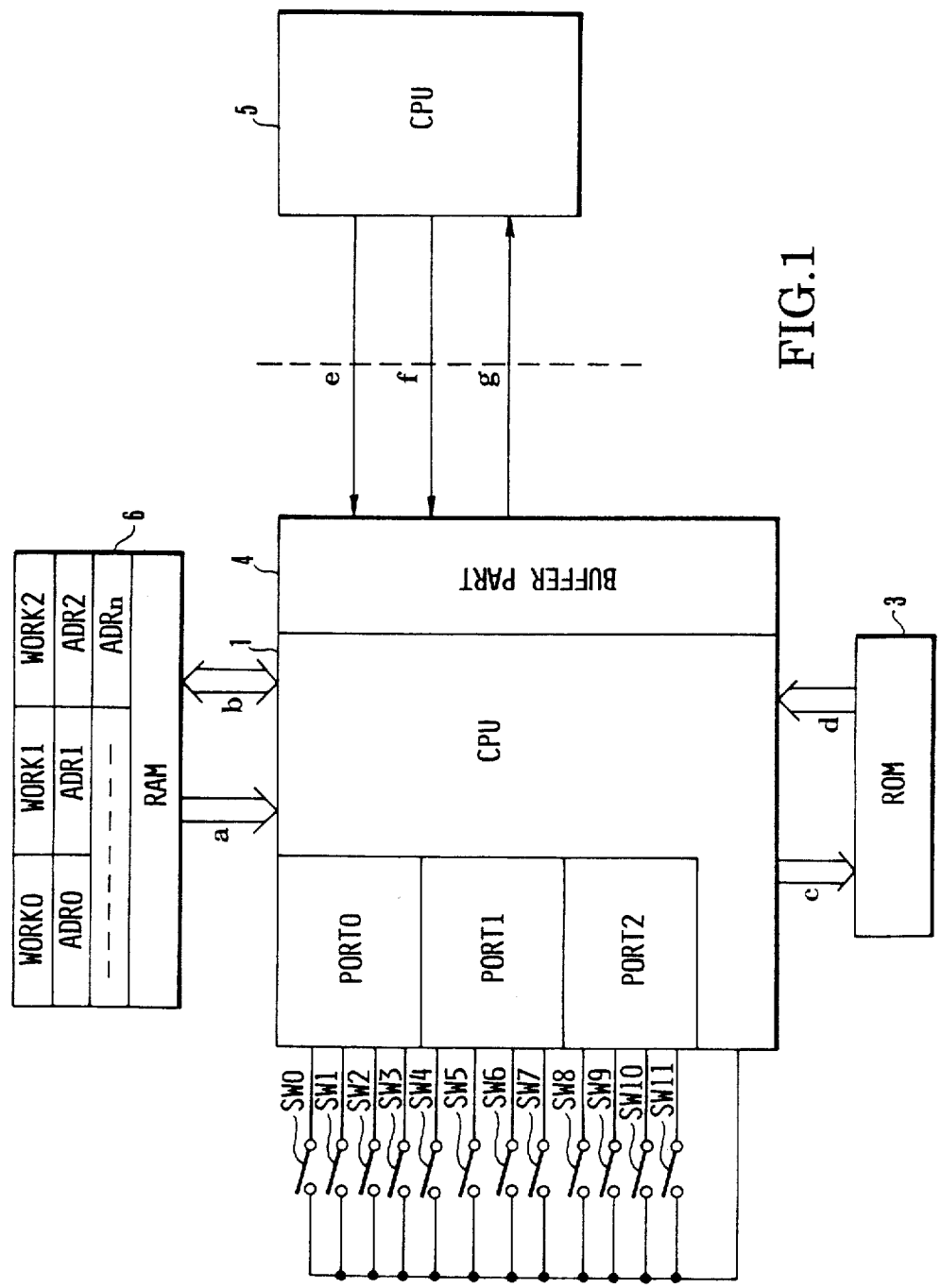
FIG. 1 is a block diagram showing an embodiment of this invention in a state of being applied to a camera.
Figure 5:
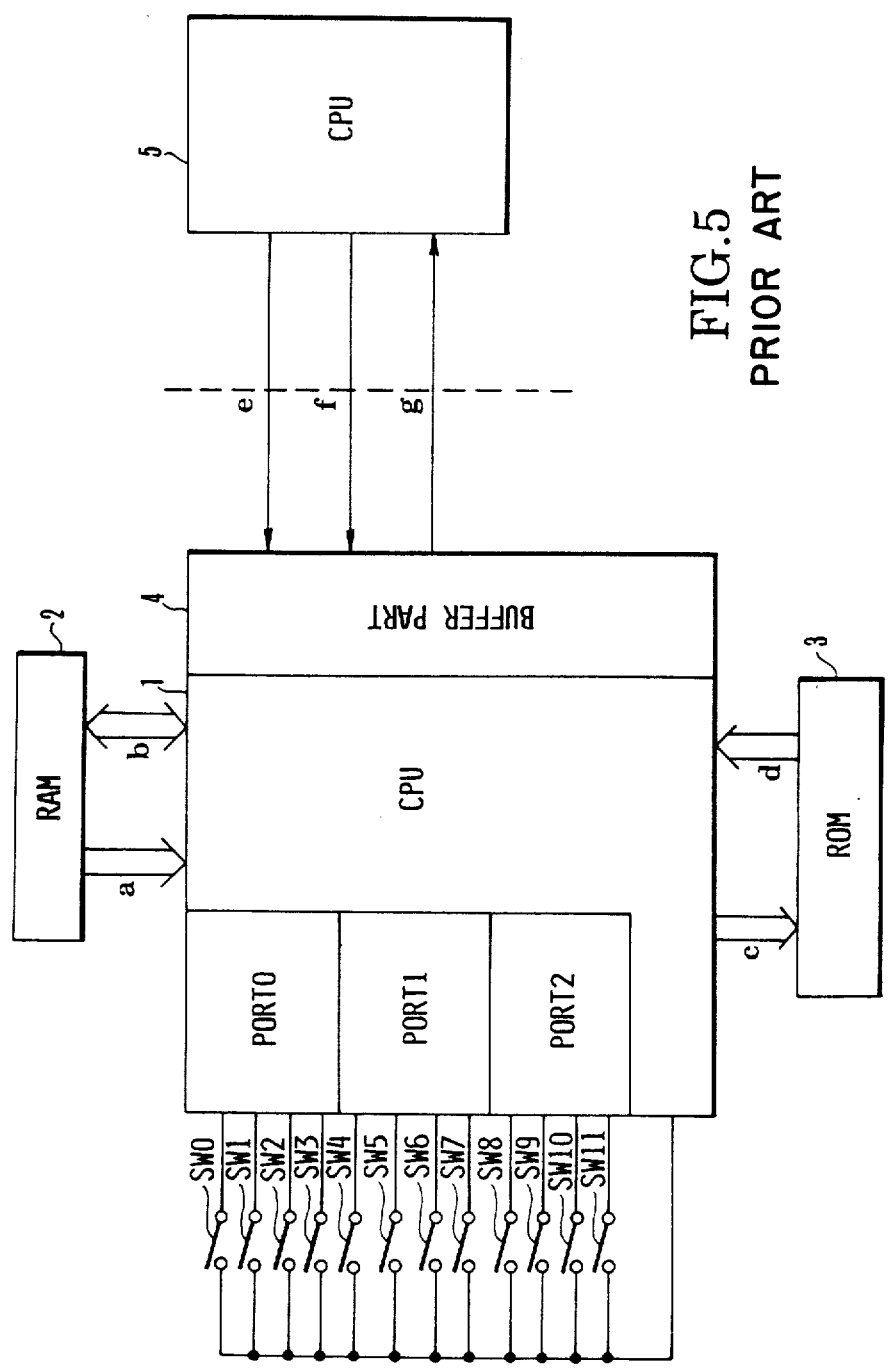
FIG. 5 is a block diagram showing the conventional information processing device in a state of being applied to a camera.

The details of this invention are as described below through embodiments thereof shown in the drawings:

FIG. 1 is a block diagram showing an embodiment of the invention. In FIG. 1, the same parts as those of FIG. 5 are indicated by the same reference numerals. A RAM 6 is provided with areas WORK0, WORK1 and WORK2 for storing information on states of switches SW0 to SW3, SW4 to SW7 and SW8 to SW11, respectively; and areas ADR0, ADR1,—and ADRn for storing addresses of a ROM 3 in which data concerning to a focal length, a full aperture value, etc. corresponding to the states of the switches has been stored.

Figure 6:
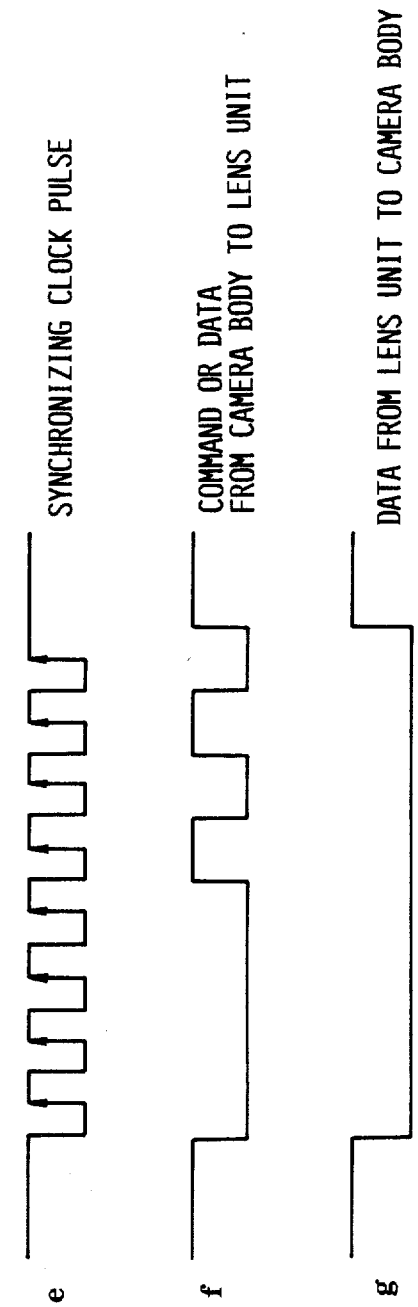
FIG. 6 is a chart showing communications generally practiced between a camera body and a lens unit.

Communication between a lens unit and a camera body is arranged to be serially carried out with eight bits used as one data. A command or data is sent from the camera body to the lens unit via a serial data line "f" in synchronism with a synchronizing clock pulse coming through a synchronizing clock line "e". Then, at the same time, data responding to a command which is previously sent from the camera body to the lens unit is transmitted from the lens unit to the camera body via a serial data line "g" (see FIG. 6).

When, for example, a command is sent from the camera body to the lens unit to transmit focal length data of two bytes, the lens unit sends the data to the camera body through the serial data line "g" in response to this command at a next and an ensuing steps of communication.

Figure 2:
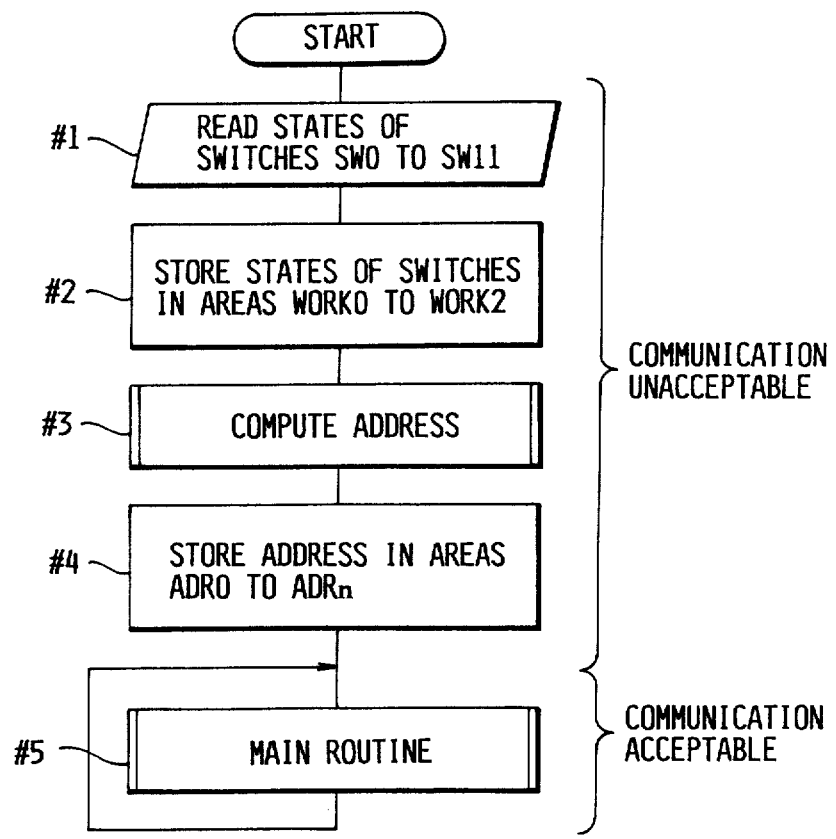
FIGS. 2 and 3 are flow charts showing the operation of the same embodiment.
Figure 8:
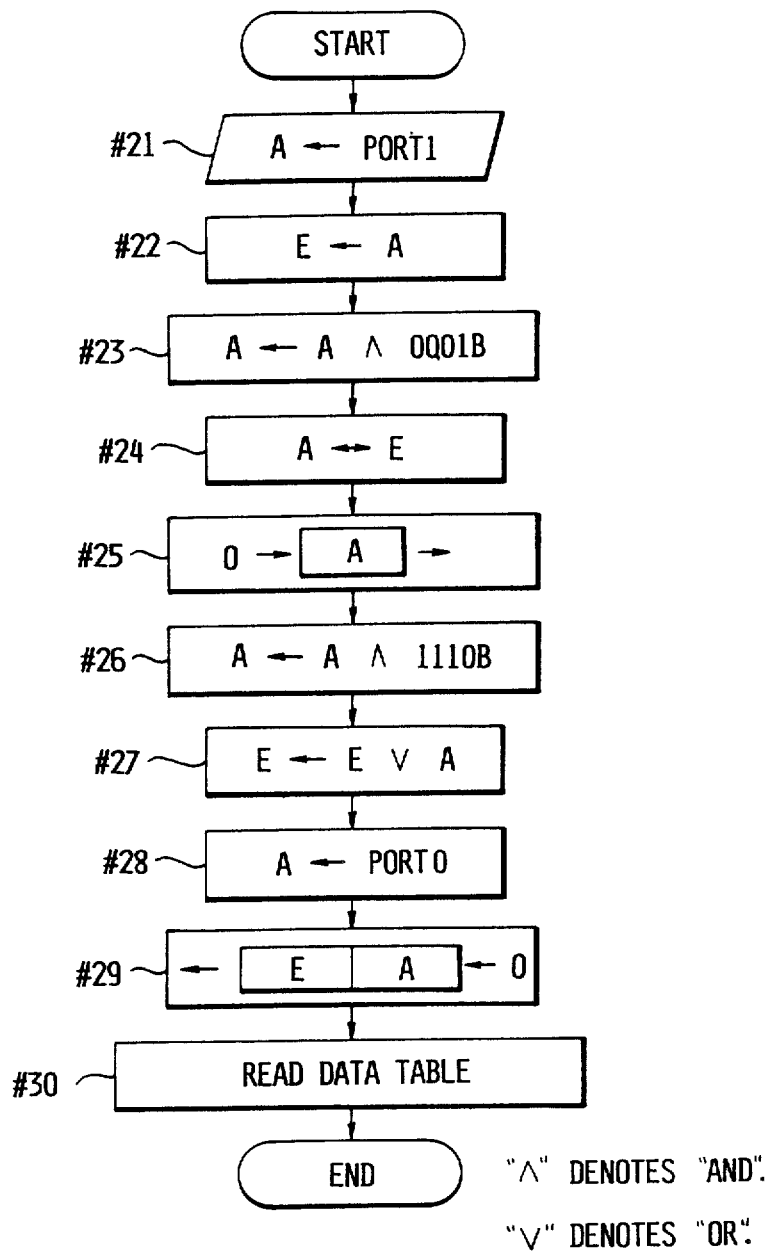
FIG. 8 is a flow chart showing the operation of the conventional device shown in FIG. 5.

Referring to FIG. 2 which is a flow chart, an initializing process is performed as follows when a power supply is switched on: Steps #1 and #2: States of the switches SW0 to SW3, SW4 to SW7 and SW8 to SW11 are respectively read out through the input ports PORT0, PORT1 and PORT2 and stored in the areas WORK0, WORK1 and WORK2 of the RAM 6. Steps #3 and #4: After completion of the step #2, an address on the ROM 3 at which data for a focal length, a full aperture value, etc. corresponding to the current switch states has been stored is computed in the same manner as the conventional procedures described in the foregoing with reference to FIG. 8. The address which has been thus determined by computation is stored in the areas ADR0, ADR1,—and ADRn.

An address of data corresponding to the current switch states remains undetermined until completion of the above-stated initializing process. Therefore, no communication from the camera body is acceptable during this period.

Step #5: After completion of the initializing process, the communication becomes acceptable between the lens unit and the camera body for a main routine. Upon receipt of communication from the camera body, the flow of operation proceeds from the step #5 to a communication processing routine which is shown in FIG. 3.

Figure 3:
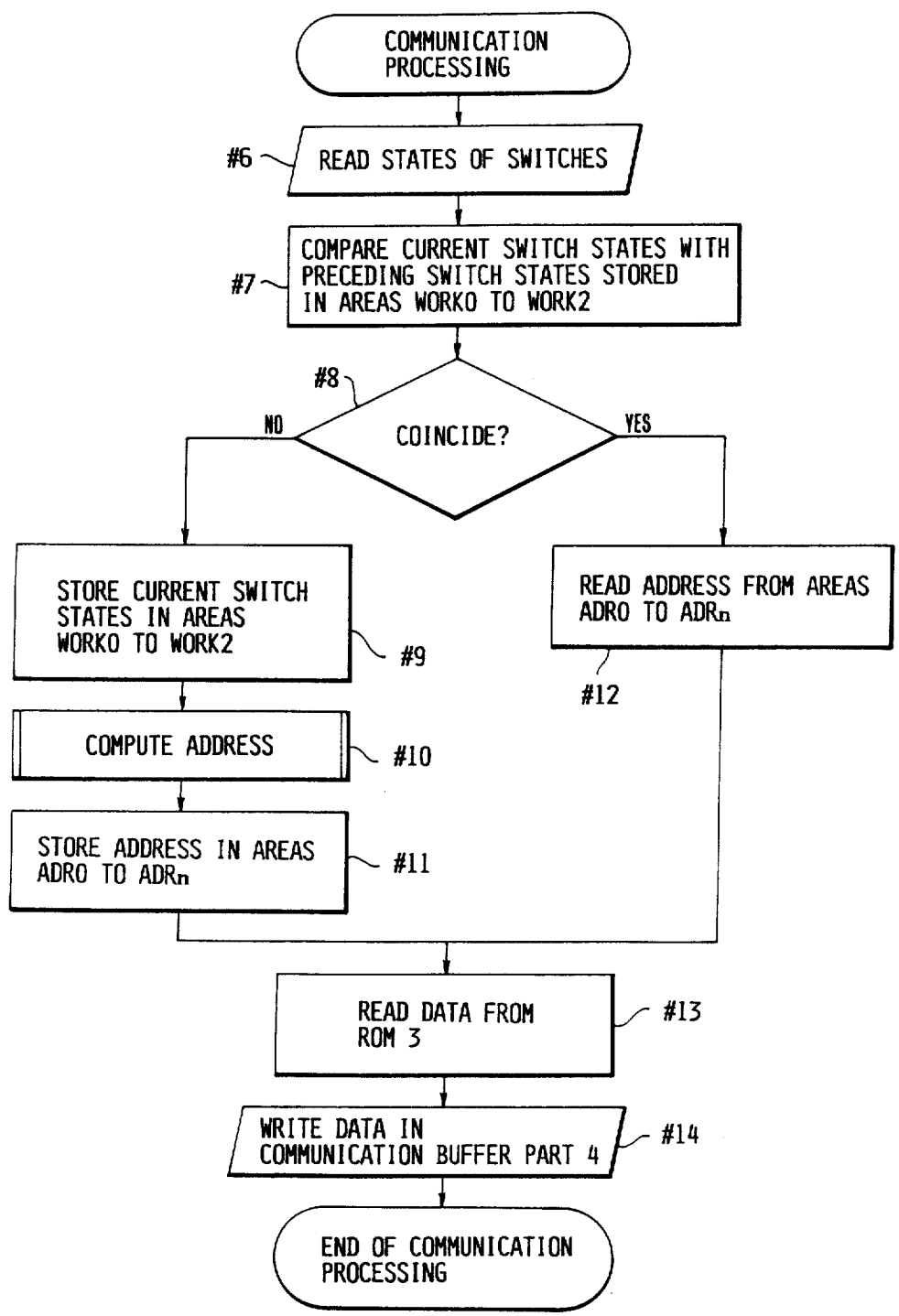

Referring to FIG. 3, in the communication processing routine, the data on the ROM 3 must be read out and sent to the camera body as quickly as possible. Steps #6 and #7: Upon receipt of communication from the camera body, states of the switches SW0 to SW11 are read out through the input ports PORT0 to PORT2. The switch states thus read out are compared with the contents of the areas WORK0, WORK1 and WORK2 which has stored the preceding switch states. In other words, the current switch states are compared with the preceding switch states. Step #8: A check is made to see if the current switch states coincide with the preceding switch states. If the current switch states are found to be the same as the preceding switch states (the probability of finding no change between the current switch states and the preceding switch states is very high as mentioned in the foregoing), the flow of operation comes to a step #12. Step #12: The previously computed address stored in the areas ADR0, ADR1,—and ADRn of the RAM 6 is taken out as an address at which data to be currently transmitted has been stored, without performing any computing operation for determining an address corresponding to the current switch states. If the current switch states are found to differ from the preceding switch states in the step #8, the flow of operation proceeds to a step #9. Step #9: The current switch states are stored in the areas WORK0 to WORK2 of the RAM 6. Steps #10 and #11: An address corresponding to the current switch states is computed in the same manner as the method described in the foregoing with reference to FIG. 8 and the address thus determined is stored in the areas ADR0 to ADRn of the RAM 6.

Step #13: Data stored in the ROM 3 is read out from the previously stored address or from the address newly determined by computation. Step #14: The data thus read out is written into the communication buffer part 4 and is transmitted to the camera body. The communication processing routine then comes to an end.

Figure 4:
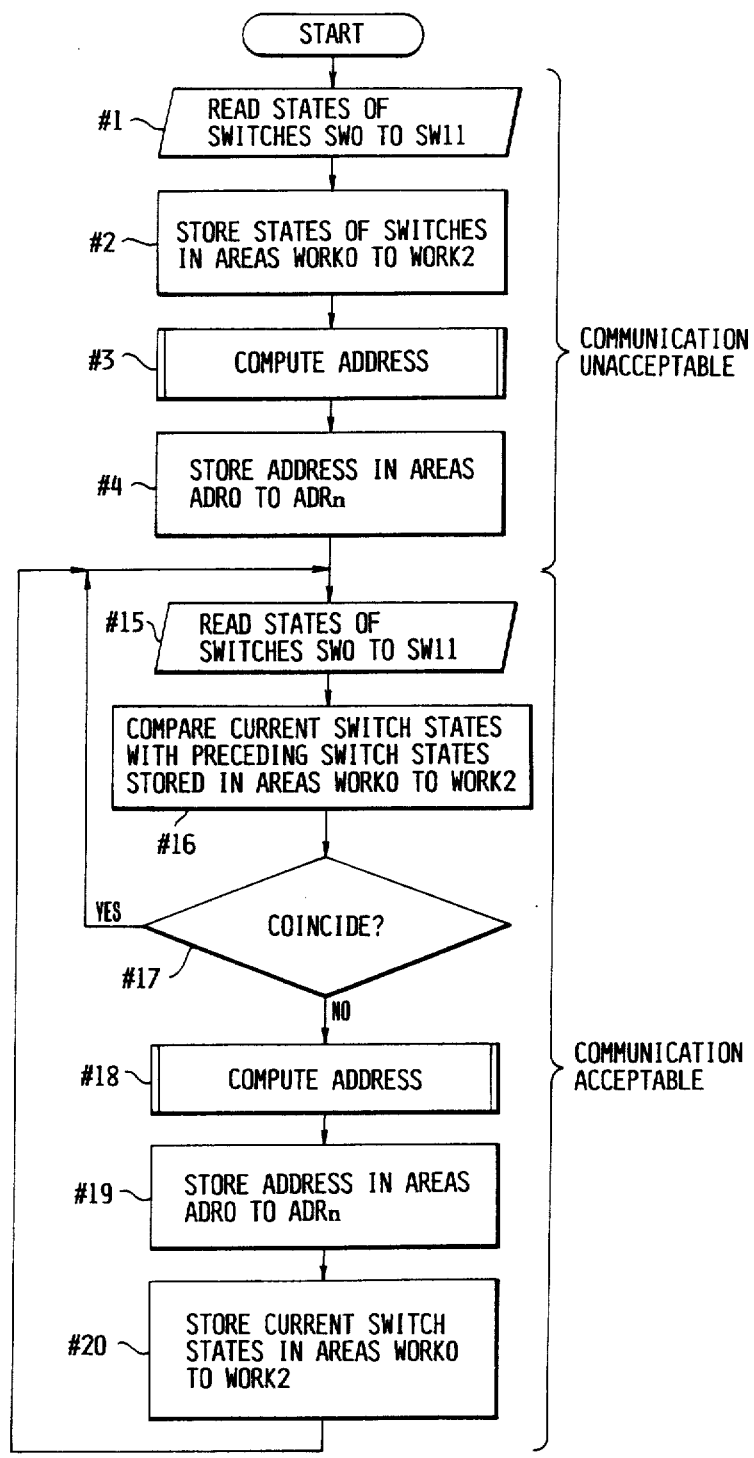
FIG. 4 is a flow chart showing the operation of another embodiment of this invention.

FIG. 4 shows in a flow chart the operation of another embodiment of this invention. In the case of the embodiment described in the foregoing, the contents of the areas WORK0 to WORK2 of the RAM 6 which store the preceding switch states and those of the areas ADR0 to ADRn which store the address corresponding to the stored switch states are arranged to be rewritten only when data is to be read out from the ROM 3 in response to communication from the camera body, except when the power supply is switched on. However, the arrangement necessitates a computing operation to be again performed for address determination every time the next data is to be read out after occurrence of a change in the switch states. This arrangement results in a longer processing time for comparison, etc. than the conventional device.

The embodiment shown in FIG. 4 solves this problem by virtue of the following arrangement: After completion of the initializing process, the flow of operation enters the main routine. In the main routine, the states of the switches SW0 to SW11 are constantly read out. Steps #15 to #17: As long as the current switch states remain unchanged from the preceding switch states, the routine of reading the states of the switches SW0 to SW11 is repeatedly executed. Steps #18 to #20: In the event of occurrence of a change in the switch states, a computing operation is newly performed to obtain the address of data corresponding to the current switch states. The result of computation is stored in the areas ADR0 to ADRn of the RAM 6 and the current switch states are stored in the areas WORK0 to WORK2.

The main routine is thus executed with the steps #15 to #20 added thereto. The additional steps greatly reduces the probability of repeated address computation in reading data during the communication processing operation. This enables the device to more efficiently take out desired data.

With the embodiment arranged in the above-stated manner, in reading data which varies according to the states of the switches, the current switch states are compared with the preceding switch states (the word "preceding" as used here includes the time at which the power supply is switched on). If the current switch states are found to have changed from the preceding switch states, the address of data corresponding to the current switch states is determined by computation. Then, the desired data is read out from a data table corresponding to the address determined. If the current switch states are found to be the same as the preceding switch states, the data is read out on the basis of the address which has been stored. This arrangement, therefore, enables the device to efficiently read out data required by the camera, for example, for distance measurement, light measurement, etc. so that computing and control operations can be accomplished at a high speed.

What is claimed is:

1. A camera system comprising a camera and an attachment device attachable to said camera wherein:
   (A) said camera has a communication terminal portion, and
   (B) said attachment device has a communication terminal portion connectable to said communication terminal portion of said camera, said attachment device further comprising:
      a computer provided with data memorizing means having a plurality of memory portions, each for memorizing respective data, and each being addressable by designation of an address,
      a plurality of information switch means, said computer having an input portion connected to said plurality of information switch means, switch state detecting means for detecting states of said information switch means,
      switch state memorizing means for memorizing said states detected by said switch state detecting means, address operation means for designating addresses corresponding to the switch states,
      address memorizing means for memorizing said addresses obtained by said address operation means, and renewal means for causing said address operation means to operate selectively when a switch state previously memorized in said switch state memorizing means is not coincident with a new switch state detected by said detecting means to renew the address previously memorized in said address memorizing mans to a newly designated address and to renew the switch state memorized in said switch state memorizing means to the new switch state detected by said detecting means, said memory portions respectively being designated by the address memorized in said address memorizing means to transfer data of the memory portion thus designated to said camera through the communication terminal portion of said attachment device.

2. A camera system according to claim 1, wherein said attachment device is a lens device.

3. A camera system according to claim 2, wherein said data communication is effected by input of a communication demand from said camera to said lens device through said communication terminal portion of said lens device.

4. A lens device attachable to a camera, comprising:
(a) a communication terminal portion connectable to a communication terminal portion of said camera, and
(b) a computer provided with data memorizing means having a plurality of memory portions, each for memorizing respective data, and each being addressable by designation of an address, a plurality of information switch means, said computer having an input portion connected to said plurality of information switch means, switch state detecting means for detecting states of said information switch means, switch state memorizing means for memorizing said states of the information switch means, address operation means for seeking addresses corresponding to the switch states detected by said detecting means, address memorizing means for memorizing addresses provided by said address operation means, and renewal means for causing said address operation means to operate selectively when the switch state previously memorized in said switch state memorizing means is not coincident with a new switch state detected by said detecting means to renew the address previously memorized in said address memorizing means to a newly operated address and to renew the switch state memorized in said switch memorizing means to the new switch state detected by said detecting means, said memory portions respectively being designated by the address memorized in said address memorizing means to output data of the memory portion thus through the communication terminal portion of said lens device.

5. A lens device according to claim 4, wherein said output of data from the communication terminal portion of said lens device is effected each time when a communication demand is input to said lens device from camera through said communication terminal portion of said lens device.

* * * * *